United States Patent
Lei (10) Patent No.: US 11,418,288 B2
(45) Date of Patent: Aug. 16, 2022

(54) FEEDBACK INFORMATION FOR A DATA BLOCK GROUP

(71) Applicant: Motorola Mobility LLC, Chicago, IL (US)

(72) Inventor: Haipeng Lei, Beijing (CN)

(73) Assignee: Motorola Mobility LLC, Chicago, IL (US)

( * ) Notice: Subject to any disclaimer, the term of this patent is extended or adjusted under 35 U.S.C. 154(b) by 224 days.

(21) Appl. No.: 16/474,968

(22) PCT Filed: Dec. 28, 2016

(86) PCT No.: PCT/CN2016/112655
§ 371 (c)(1),
(2) Date: Jun. 28, 2019

(87) PCT Pub. No.: WO2018/119750
PCT Pub. Date: Jul. 5, 2018

(65) Prior Publication Data
US 2019/0342036 A1 Nov. 7, 2019

(51) Int. Cl.
*H04L 1/00* (2006.01)
*H04L 1/16* (2006.01)
(Continued)

(52) U.S. Cl.
CPC .......... *H04L 1/1635* (2013.01); *H04L 1/1896* (2013.01); *H04W 84/042* (2013.01)

(58) Field of Classification Search
USPC .... 370/230, 230.1, 236, 242, 252, 328, 329, 370/330, 468, 473, 476
See application file for complete search history.

(56) References Cited

U.S. PATENT DOCUMENTS

2010/0031110 A1    2/2010  Seok et al.
2011/0276852 A1*  11/2011  Mueller-Weinfurtner .................
                                                           H04L 1/1835
                                                           714/E11.112
(Continued)

FOREIGN PATENT DOCUMENTS

CN        101958775 A        1/2011
CN        104639300 A        5/2015
(Continued)

OTHER PUBLICATIONS

Nokia et al, "HARQ operation for large transport block sizes", 3GPP TSG-RAN WG1#87 R1-1612244, Nov. 14-18, 2016, pp. 1-5.
(Continued)

*Primary Examiner* — Nguyen H Ngo
(74) *Attorney, Agent, or Firm* — Kunzler Bean & Adamson (57) ABSTRACT

Apparatuses, methods, and systems are disclosed for transmitting and/or receiving feedback information for a data block group. One apparatus (102) includes a processor (202) that determines (502) a data block group size of a data block group for received data. Each data block in the data block group is independently decodable. The processor (202) generates (504) feedback information for the data block group of the received data. The feedback information is used for indicating a decoding status corresponding to the data block group. The apparatus (102) also includes a transmitter (210) that transmits (506) the feedback information for the data block group.

18 Claims, 6 Drawing Sheets

(51) Int. Cl.
 *H04L 1/18* (2006.01)
 *H04W 84/04* (2009.01)

(56) References Cited

U.S. PATENT DOCUMENTS

| | | | | |
|---|---|---|---|---|
| 2012/0039158 | A1* | 2/2012 | Cheng | H04B 7/0671 370/203 |
| 2012/0039279 | A1 | 2/2012 | Chen et al. | |
| 2014/0376358 | A1* | 12/2014 | Eder | H04L 1/0057 370/216 |
| 2015/0156763 | A1* | 6/2015 | Seo | H04L 5/1469 370/329 |
| 2016/0192354 | A1* | 6/2016 | Wei | H04L 1/0073 370/329 |
| 2016/0205679 | A1* | 7/2016 | Yoo | H04L 5/0057 370/329 |
| 2016/0212734 | A1* | 7/2016 | He | H04L 1/1861 |
| 2017/0048886 | A1* | 2/2017 | Sun | H04W 72/14 |
| 2017/0214497 | A1* | 7/2017 | Lee | H04L 1/1896 |
| 2018/0027550 | A1* | 1/2018 | Berggren | H04W 72/042 370/329 |
| 2018/0145703 | A1* | 5/2018 | Li | H04L 1/1816 |
| 2018/0323907 | A1* | 11/2018 | Takeda | H04L 1/1812 |
| 2018/0359072 | A1* | 12/2018 | Tiirola | H04L 1/1812 |
| 2019/0191487 | A1* | 6/2019 | Kwon | H04W 80/02 |

FOREIGN PATENT DOCUMENTS

| | | |
|---|---|---|
| CN | 105515719 A | 4/2016 |
| EP | 2913951 A2 | 9/2015 |
| WO | 2009137646 A2 | 11/2009 |
| WO | 2010124238 A2 | 10/2010 |
| WO | 2016126653 A1 | 8/2016 |

OTHER PUBLICATIONS

PCT/CN2016/112655, "Notification of Transmittal of the International Search Report and the Written Opinion of the International Searching Authority, or the Declaration", International Searching Authority, Aug. 30, 2017, pp. 1-11.

* cited by examiner

FEEDBACK INFORMATION FOR A DATA BLOCK GROUP

FIELD

The subject matter disclosed herein relates generally to wireless communications and more particularly relates to feedback information for a data block group.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Channel State Information ("CSI"), Common Search Space ("CSS"), Downlink Control Information ("DCI"), Downlink ("DL"), Downlink Pilot Time Slot ("DwPTS"), Enhanced Clear Channel Assessment ("eCCA"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Licensed Assisted Access ("LAA"), Load Based Equipment ("LBE"), Listen-Before-Talk ("LBT"), Long Term Evolution ("LTE"), Multiple Access ("MA"), Machine Type Communication ("MTC"), Multiple Input Multiple Output ("MIMO"), Multi User Shared Access ("MUSA"), Negative-Acknowledgment ("NACK") or ("NAK"), Next Generation Node B ("gNB"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, DL TBs are carried on the PDSCH. In such networks, a maximum of two TBs may be transmitted on PDSCH in one serving cell and in one subframe. HARQ-ACK feedback bits corresponding to the PDSCH are transmitted either on the PUCCH or on the PUSCH.

In some configurations, the carrier bandwidth for 5G may be at least 100 MHz for below 6 GHz bands and may be increased to around 1 GHz for high frequency bands (e.g., millimeter wave bands). Due to a wide carrier bandwidth, data transmission over the full carrier bandwidth may result in a large transport block size ("TBS"). In certain configurations, such as LTE, the maximum code block ("CB") size is limited to 6,144 bits. If a TB is larger than the maximum CB size limit (e.g., 6,144 bits), the TB may be segmented into several CBs so that each CB size is less than or equal to the maximum CB size limit. Such a segmentation may reduce the complexity of channel encoding/decoding.

In some configurations, such as LTE, the maximum TBS may be set to 97,896 bits and may be used in conditions in which 256 quadrature amplitude modulation ("QAM") modulation is used with 110 PRBs assigned. The TBS may be divided into 16 CBs with the maximum code block size ("CBS") of 6,144. Furthermore, the TBS may be increased to larger values when more than one transmission layer is configured via spatial multiplexing. Therefore, in 5G with larger carrier bandwidth (e.g., at least 100 MHz), with more layers via spatial multiplexing, the number of CBs for the maximum TBS may be larger than one hundred.

In various configurations, such as LTE, if the length of the input bit sequence to the CB segmentation is larger than 6,144, segmentation of the input bit sequence is performed and an additional 24-bit cyclic redundancy check ("CRC") sequence is attached to each CB so that each CB may be decoded independently. If all of the CBs of a TB are correctly decoded, the TB may be considered a correctly decoded TB and a corresponding HARQ-ACK may be set to ACK; otherwise, the TB may be considered an incorrectly decoded TB and the corresponding HARQ-ACK may be set to NACK even though there may be only one CB that is incorrectly decoded. If a NACK is reported from a receiving device to a transmitting device, the transmitting device may have to retransmit all the CBs of the TB. Retransmission of the whole TB may lead to significant performance degradation due to excessive resource use.

In certain networks, a retransmission mechanism may only need one-bit ACK or NACK reported from the receiving device to the transmitting device. A more precise retransmission mechanism may use more overhead for HARQ-ACK reporting. In one embodiment, the most efficient retransmission may be to only retransmit failed CBs; however, reporting each failed CB may require multiple HARQ-ACK bits with each HARQ-ACK bit corresponding to one CB. The overhead for HARQ-ACKs in such an embodiment may be too large and there may not be sufficient resources to transmit such a large ACK/NACK payload.

BRIEF SUMMARY

Apparatuses for transmitting feedback information for a data block group are disclosed. Methods and systems also perform the functions of the apparatus. In one embodiment, the apparatus includes a processor that determines a data block group size of a data block group for received data. In such an embodiment, each data block in the data block group is independently decodable. In certain embodiments, the processor generates feedback information for the data block group of the received data. In such embodiments, the feedback information is used for indicating a decoding status corresponding to the data block group. The apparatus also includes a transmitter that transmits the feedback information for the data block group.

In one embodiment, the apparatus includes a receiver that receives a signal indicating a set of data block group sizes. In a further embodiment, the receiver receives a signal indicating the data block group size from the set of data block group sizes for the received data. In certain embodiments, the apparatus includes a receiver that receives a signal indicating the data block group size from a predefined set of data block group sizes for the received data.

In some embodiments, the processor determines the data block group size corresponding to the received data by selecting the data block group size from a predefined set of data block group sizes based on a number of data blocks of received data. In various embodiments, the processor generates the feedback information for the data block group of the received data by performing a logic operation on a decoding status corresponding to each data block of the data block group. In certain embodiments, the logic operation includes an AND operation. In one embodiment, the received data includes multiple data block groups and a number of data blocks in a last data block group of the multiple data block groups is smaller than the data block group size. In some embodiments, the data block group size is a feedback bundling size for generating a decoding status of a whole data block group by performing a logic AND operation on a decoding status corresponding to each data block within the data block group of the received data. In various embodiments, the decoding status corresponding to each data block is an ACKNOWLEDGEMENT ("ACK") in response to the respective data block being correctly decoded and a NEGATIVE ACKNOWLEDGEMENT ("NACK") in response to the respective data block not being correctly decoded.

In certain embodiments, the received data includes multiple data block groups and feedback information for each data block group of the multiple data block groups of the received data is transmitted together. In some embodiments, data blocks in the data block group have consecutive data block numbers. In various embodiments, a number of data block groups of the received data is equal to a ceiling of a number of data blocks of the received data divided by the data block group size.

A method for transmitting feedback information for a data block group, in one embodiment, includes determining a data block group size of a data block group for received data. In such an embodiment, each data block in the data block group is independently decodable. The method also includes generating feedback information for the data block group of the received data. In certain embodiments, the feedback information is used for indicating a decoding status corresponding to the data block group. The method includes transmitting the feedback information for the data block group.

In one embodiment, an apparatus includes a transmitter that transmits data. The apparatus also includes a receiver that receives feedback information for indicating a decoding status corresponding to a data block group of the transmitted data. In such embodiments, the data block group includes multiple data blocks and each data block is independently decodable.

In one embodiment, the apparatus includes a processor that determines a size of the data block group for the transmitted data. In a further embodiment, the transmitter transmits a signal indicating a set of sizes of the data block group. In certain embodiments, the transmitter transmits a signal indicating a size of the data block group from the set of the sizes of the data block group for the transmitted data.

In some embodiments, the transmitter transmits a signal indicating the size of the data block group from a predefined set of sizes of the data block group for the transmitted data. In various embodiments, a size of the data block group is selected from a predefined set of sizes of the data block group based on a number of data blocks of the transmitted data. In certain embodiments, the feedback information for a data block group of the transmitted data is generated by performing a logic operation on a decoding status corresponding to each data block within the data block group of the transmitted data. In one embodiment, the logic operation includes an AND operation. In some embodiments, the transmitted data includes multiple data block groups and a number of data blocks in a last data block group of the multiple data block groups is smaller than that of other data block groups of the multiple data block groups. In various embodiments, a data block group size is a feedback bundling size for generating a decoding status of a whole data block group by performing logic AND operation on a decoding status corresponding to each data block within the data block group of the transmitted data.

In certain embodiments, the decoding status corresponding to each data block is an ACK in response to the respective data block being correctly decoded and a NACK in response to the respective data block not being correctly decoded. In some embodiments, the transmitted data includes multiple data block groups and the feedback information for each data block group of the multiple data block groups of the transmitted data is received together. In various embodiment, data blocks in the data block group have consecutive data block number. In one embodiment, a number of data block groups of the transmitted data is equal to a ceiling of a number of data blocks of the transmitted data divided by the data block group size. In certain embodiments, the transmitter retransmits data blocks within the data block group of the transmitted data in response to corresponding feedback information for the data block group indicating that the data blocks within the data block group are not being correctly decoded. In some embodiments, the transmitter transmits signaling indicating a size of a data block group for the retransmitted data.

A method for receiving feedback information for a data block group, in one embodiment, includes transmitting data. The method also includes receiving feedback information for indicating a decoding status corresponding to a data block group of the transmitted data. In such embodiments, the data block group includes multiple data blocks and each data block is independently decodable.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
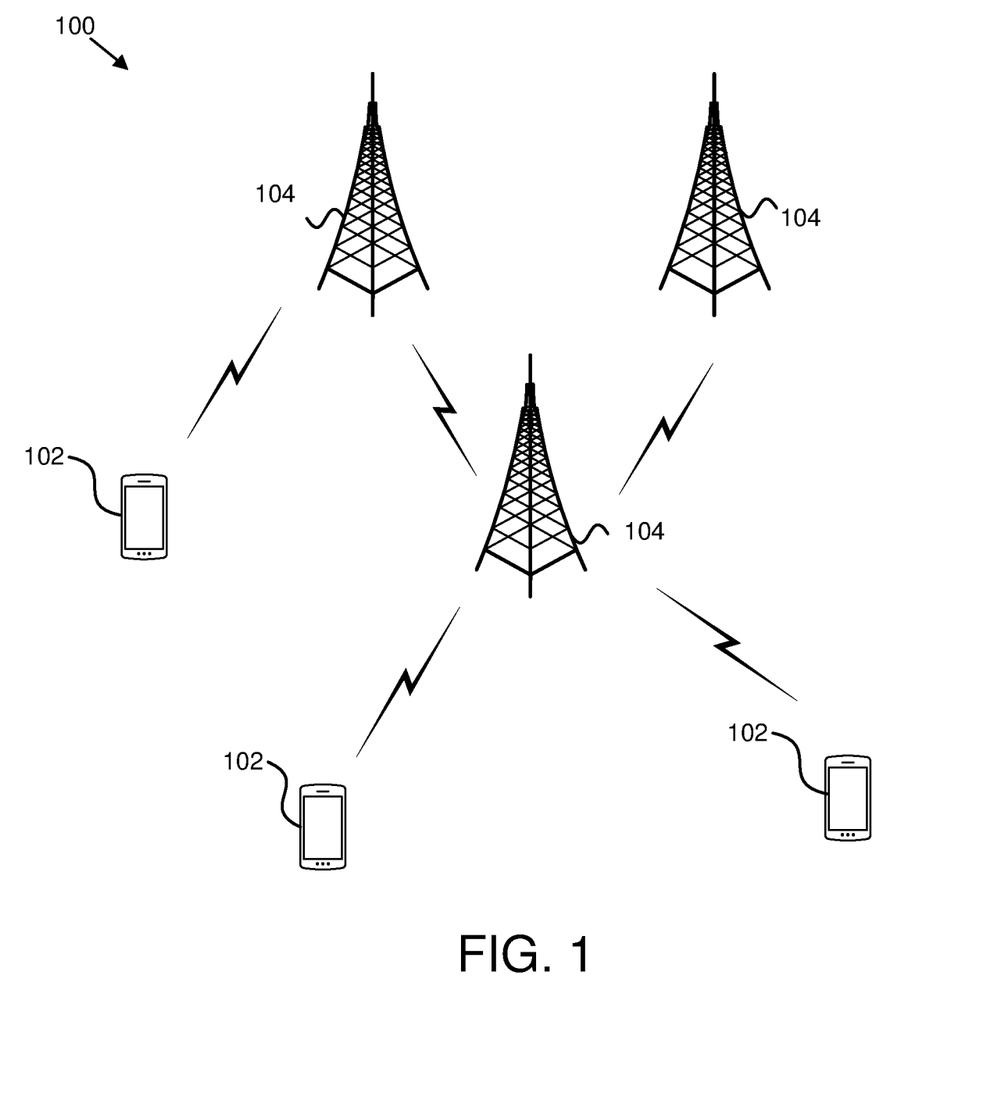
FIG. 1 is a schematic block diagram illustrating one embodiment of a wireless communication system for transmitting and/or receiving feedback information for a data block group.

FIG. 1 depicts an embodiment of a wireless communication system 100 for transmitting and/or receiving feedback information for a data block group. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a base unit 104 may transmit data. The base unit 104 may also receive feedback information for indicating a decoding status corresponding to a data block group of the transmitted data. To reduce the complexity of encoding and decoding, data exceeding a maximum data block size may be segmented to multiple data blocks and each data block may be independently decodable. Each data block being "independently decodable" may mean that a data block may be decoded separately and/or independently from other data blocks. Multiple data blocks may be grouped into a single data block group. Accordingly, a base unit 104 may receive feedback information for a data block group.

In another embodiment, a remote unit 102 may determine a data block group size of a data block group for received data. In such an embodiment, each data block in the data block group is independently decodable. The remote unit 102 may generate feedback information for the data block group of the received data. The feedback information may be used for indicating a decoding status corresponding to the data block group. The remote unit 102 may transmit the feedback information for the data block group. Accordingly, a remote unit 102 may transmit feedback information for a data block group.

In certain embodiments, a remote unit 102 may transmit data. The remote unit 102 may also receive feedback information for indicating a decoding status corresponding to a data block group of the transmitted data. The data block group may include multiple data blocks and each data block may be independently decodable. Each data block being "independently decodable" may mean that a data block may be decoded separately and/or independently from other data blocks. Accordingly, a remote unit 102 may receive feedback information for a data block group.

In various embodiments, a base unit 104 may determine a data block group size of a data block group for received data. In such embodiments, each data block in the data block group is independently decodable. The base unit 104 may generate feedback information for the data block group of the received data. The feedback information may be used for indicating a decoding status corresponding to the data block group. The base unit 104 may transmit the feedback information for the data block group. Accordingly, a base unit 104 may transmit feedback information for a data block group.

Figure 2:
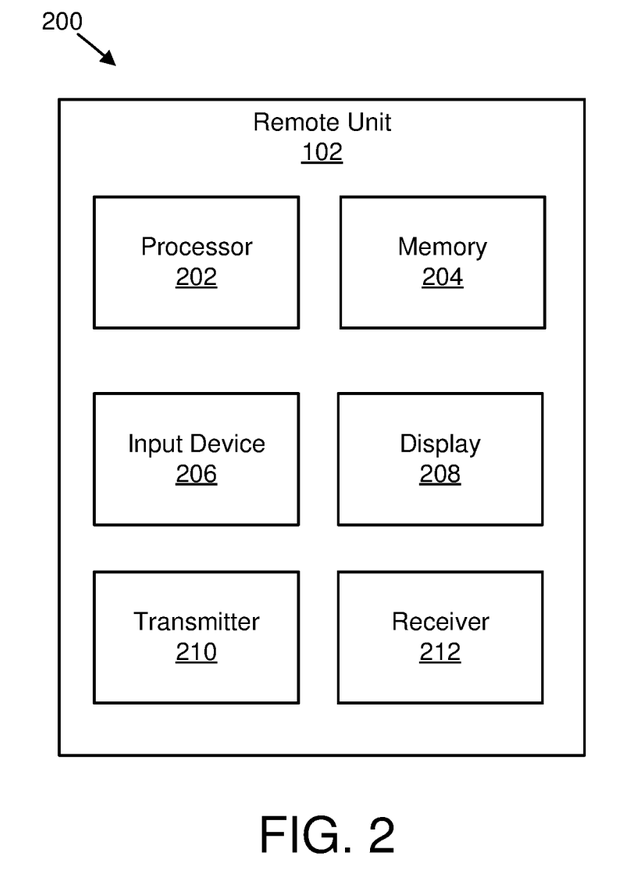
FIG. 2 is a schematic block diagram illustrating one embodiment of an apparatus that may be used for transmitting and/or receiving feedback information for a data block group.

FIG. 2 depicts one embodiment of an apparatus 200 that may be used for transmitting and/or receiving feedback information for a data block group. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 may determine a data block group size of a data block group for received data. In such embodiments, each data block in the data block group may be independently decodable. In various embodiments, the processor 202 may generate feedback information for a data block group of received data. In such embodiments, the feedback information is used for indicating a decoding status corresponding to the data block group. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to data block group sizes. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment, the transmitter 210 is used to transmit data. In certain embodiments, the transmitter 210 may be used to transmit feedback information for a data block group. In one embodiment, the receiver 212 may be used to receive feedback information for indicating a decoding status corresponding to a data block group of the transmitted data. In such an embodiment, the data block group includes multiple data blocks and each data block is independently decodable. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
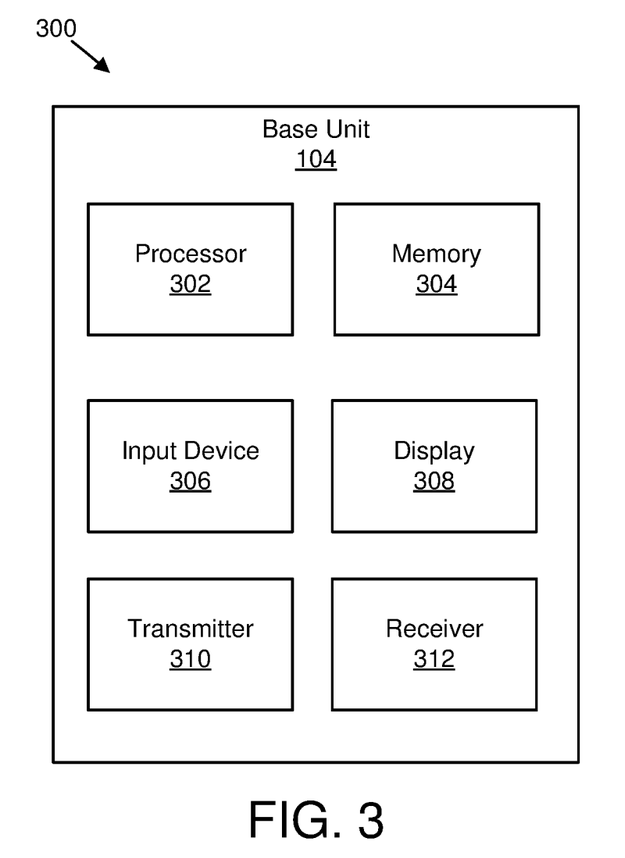
FIG. 3 is a schematic block diagram illustrating one embodiment of an apparatus that may be used for transmitting and/or receiving feedback information for a data block group.

FIG. 3 depicts one embodiment of an apparatus 300 that may be used for transmitting and/or receiving feedback information for a data block group. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
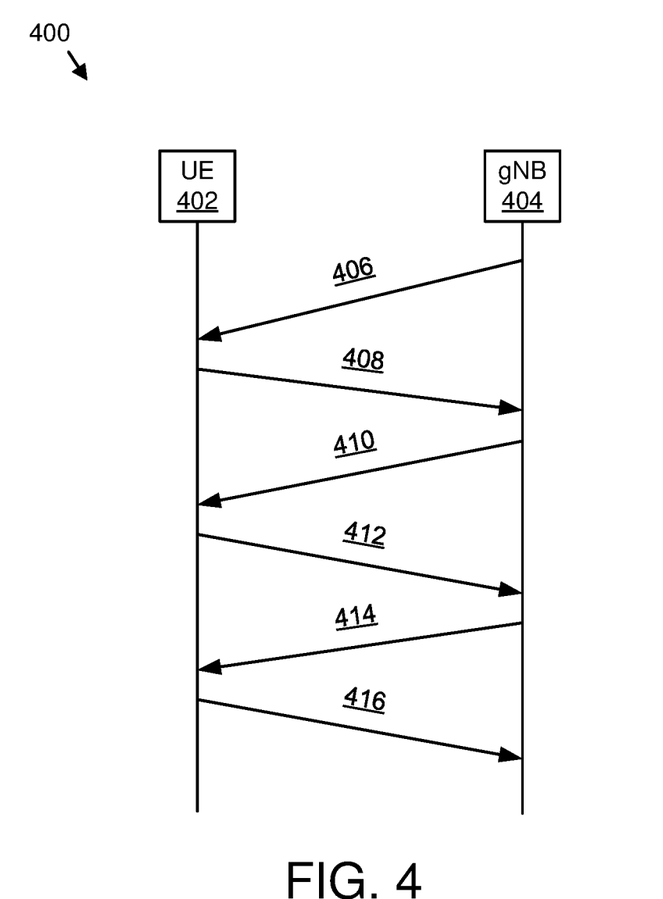
FIG. 4 illustrates one embodiment of communications for transmitting and/or receiving feedback information for a data block group.

FIG. 4 illustrates one embodiment of communications 400 for transmitting and/or receiving feedback information for a data block group. Specifically, communications 400 between a UE 402 and a gNB 404 are illustrated. A first communication 406 may include data transmitted from the gNB 404 and received by the UE 402. In some embodiments, the data may include any suitable number of data blocks. The UE 402 may determine a data block group size of a data block group for the received data. Each data block may be independently decodable. As may be appreciated, each data block being "independently decodable" may mean that a data block may be decoded separately and/or independently from other data blocks. For example, one data block group may include four data blocks (i.e., a first data block, a second data block, a third data block, and a fourth data block). Each of the first, second, third, and fourth data blocks may be decoded independently (e.g., without relying on the other data blocks). In one example, a data block group size may be 1, 2, 4, 8, 16, 32, 64, 128 data blocks, or another size. Received data may be divided into multiple data block groups based on the determined data block group size. For example, if the received data is 128 data blocks, the data block group size may be 16 data blocks so that there are 8 data block groups each having a data block group size of 16 data blocks.

A second communication 408 includes a transmission of feedback information from the UE 402 to the gNB 404. The feedback information may be transmitted as 1, 2, 3, 4, 5, 6, 7, 8, or more bits. In one embodiment, each bit of the feedback information corresponds to a data block group. For example, based on the determined data block group size, if the received data is divided into 8 data block groups, then one bit of the feedback information corresponds to each of the 8 data block groups resulting in feedback information having 8 HARQ-ACK bits. As may be appreciated, if any of the data blocks in a data block group is not received and/or decoded properly, the bit for the whole data block group will provide NACK feedback. In contrast, if all of the data blocks in a data block group are received and decoded properly, the bit for the whole data block group will provide ACK feedback. If any NACKs are received, a third communication 410 includes a retransmission of data from the gNB 404 to the UE 402. The retransmission of data retransmits data corresponding to the NACKs received by the gNB 404. For example, if there are 8 HARQ-ACK bits corresponding to 8 data blocks and the first HARQ-ACK bit is the only HARQ-ACK bit that includes a NACK, then all the data blocks within the data block group corresponding to the first HARQ-ACK bit will be retransmitted. Assuming that there were originally 128 data blocks and each data block group size has a size of 16 data blocks, the first HARQ-ACK bit corresponds to the first 16 data blocks in the original transmission. Accordingly, in the third communication 410 only the first 16 data blocks are retransmitted.

A fourth communication 412 includes a transmission of feedback information from the UE 402 to the gNB 404. The feedback information may be transmitted as 1, 2, 3, 4, 5, 6, 7, 8, or more bits. In one embodiment, each bit of the feedback information corresponds to a data block group. For example, based on the determined data block group size, if the received data is divided to 4 data block groups, then one bit of the feedback information corresponds to each of the 4 data block groups resulting in feedback information having 4 HARQ-ACK bits. As may be appreciated, if any of the data blocks in a data block group is not received and/or decoded properly, the bit for the whole data block group will provide NACK feedback. In contrast, if all of the data blocks in a data block group are received and decoded properly, the bit for the whole data block group will provide ACK feedback. If any NACKs are received, a fifth communication 414 includes a retransmission of data from the gNB 404 to the UE 402. The retransmission of data retransmits data corresponding to the NACKs received by the gNB 404. For example, if there are 4 HARQ-ACK bits corresponding to 4 data block groups and the first HARQ-ACK bit is the only HARQ-ACK bit that includes a NACK, then all the data blocks within the data block group corresponding to the first HARQ-ACK bit will be retransmitted. Assuming in the retransmission there were 16 data blocks and each data block group size has a size of 2 data blocks, then the 16 data blocks can be divided to 8 data block groups resulting in 8 HARQ-ACK bits. Assuming the first HARQ-ACK bit corresponding to the first 2 data blocks includes NACK, accordingly, in the fifth communication 414 only the first 2 data blocks are retransmitted. As another example, assuming in the retransmission there were 16 data blocks and each data block group size has a size of 4 data blocks, then there are 4 data block groups and one bit of the feedback information corresponds to each of the 4 data block groups resulting in feedback information having 4 HARQ-ACK bits. Assuming the first HARQ-ACK bit corresponding to the first 4 data blocks includes NACK, accordingly, in the fifth communication 414 only the first 4 data blocks are retransmitted.

A sixth communication 416 includes a transmission of feedback information from the UE 402 to the gNB 404. The feedback information may be transmitted as 1, 2, 3, 4, 5, 6, 7, 8, or more bits. In one embodiment, each bit of the feedback information corresponds to a data block group. As may be appreciated, if any of the data blocks in a data block group is not received and/or decoded properly, the bit for the whole data block group will provide NACK feedback. In contrast, if all of the data blocks in a data block group are received and decoded properly, the bit for the whole data block group will provide ACK feedback. In the example used herein, assuming there were only 2 data blocks in the retransmission of the fifth communication 414, there may be two HARQ-ACK bits used with each HARQ-ACK bit used for only one data block.

In one embodiment, RRC signaling may be used to configure a set of possible bundling size (e.g., data block group size) for the HARQ-ACK bits corresponding to all the data blocks for a given TB. In certain embodiments, the concrete bundling size out of the set of possible bundling sizes may be dynamically indicated by gNB 404 in DL assignment in each (re)transmission for the given TB. In other embodiments, the UE 402 may dynamically select the bundling size out of the set of possible bundling sizes. Upon reception of the DL assignment and corresponding (re)transmitted data, the UE 402 may decode each data block, list the corresponding HARQ-ACK bits in the ascending order of data block number, then start HARQ-ACK bundling by performing logic AND operation for the consecutive HARQ-ACK bits with the dynamically indicated bundling size from the first HARQ-ACK bit. In some embodiments, the number of data blocks in the last one or more data block groups may be smaller than the indicated bundling size. In such embodiments, HARQ-ACK bundling may be performed among those HARQ-ACK bits corresponding to data blocks within one data block group.

For example, the gNB 404 may configure a bundling size set or data block group size (e.g., {1, 2, 4, 8, 16, 32, 64, 128}) via RRC signaling to include the possible bundling sizes (i.e., data block group sizes) for data blocks for one given TB. With the above-listed bundling size set, 3 bits may be used in DL assignment to indicate one of values in the configured bundling size set for DL data transmission. Correspondingly, with the above-listed bundling size set, 3 bits may be used in UL assignment to indicate one of values in the configured bundling size set for UL data transmission. Assuming, for example in DL data transmission, that the TB has 128 CBs, in the initial data transmission, the gNB 404 may indicate the bundling size of 16 in the DL assignment for the transmission of 128 CBs. Upon reception of the DL assignment and corresponding data, the UE 402 decodes all the transmitted CBs and lists the corresponding HARQ-ACK bits in the ascending order of code block number (e.g., ACK0, ACK1, . . . , ACK127 for corresponding CB0, CB1, . . . , CB127). Then, according to the indicated bundling size of 16, every 16 consecutive HARQ-ACK bits are bundled to one group and consolidated to one HARQ-ACK bit by a logic AND operation for the corresponding CB group. In this way, eight HARQ-ACK bits are generated and transmitted from the UE 402 to the gNB 404. In a second transmission, the gNB 404 may retransmit the "NACKed" CB groups (e.g., CB groups for which a NACK is received by the gNB 404) and adjust the bundling size value to balance the tradeoff between reporting overhead and the new CB group size. Assuming only one CB group is "NACKed", this is likely considering a 90% success probability is assumed for each transmission in the gNB 404 scheduling, then the gNB 404 may retransmit the 16 CBs of the "NACKed" CB group and dynamically adjust the bundling size of 4 in the DL assignment for the retransmission. Upon reception of this new DL assignment and retransmitted CBs, the UE 402 may decode all the 16 code blocks and perform HARQ-ACK bundling for every 4 consecutive CBs. In this way, four HARQ-ACK bits may be generated and transmitted from the UE 402 to the gNB 404. In case of "NACKed" CB groups of 4 CBs, the gNB 404 may retransmit the "NACKed" CBs and further adjust the bundling size value in the DL assignment according to the number of CBs to be retransmitted in a next retransmission.

In another embodiment, a series of HARQ-ACK bundling sizes may be predefined and fixed in specification corresponding to the number of CBs in one TB. Because both the gNB 404 and the UE 402 may know the number of CBs of one TB for each transmission, the UE 402 may derive the HARQ-ACK bundling size based on the number of CBs in a (re)transmission and perform HARQ-ACK bundling then transmit the finally bundled HARQ-ACK bits to the gNB 404. For the "NACKed" CB group, the gNB 404 may retransmit it. Correspondingly, the UE 402 may decode the received CBs and derive the HARQ-ACK bundling size based on the number of CBs in the (re)transmission and perform HARQ-ACK bundling based on the number of CBs in the transmission then transmit the finally bundled HARQ-ACK bits to the gNB 404. For example, Table 1 provides one embodiment of predefined HARQ-ACK bundling sizes.

TABLE 1

| Number of CBs in (Re)Transmission | HARQ-ACK Bundling Size |
|---|---|
| CBs > 256 | 128 |
| 256 <= CBs > 128 | 64 |
| 128 <= CBs > 64 | 32 |
| 64 <= CBs > 32 | 16 |
| 32 <= CBs > 16 | 8 |
| 16 <= CBs > 8 | 4 |
| 8 <= CBs > 4 | 2 |
| CBs <= 4 | 1 |

Figure 5:
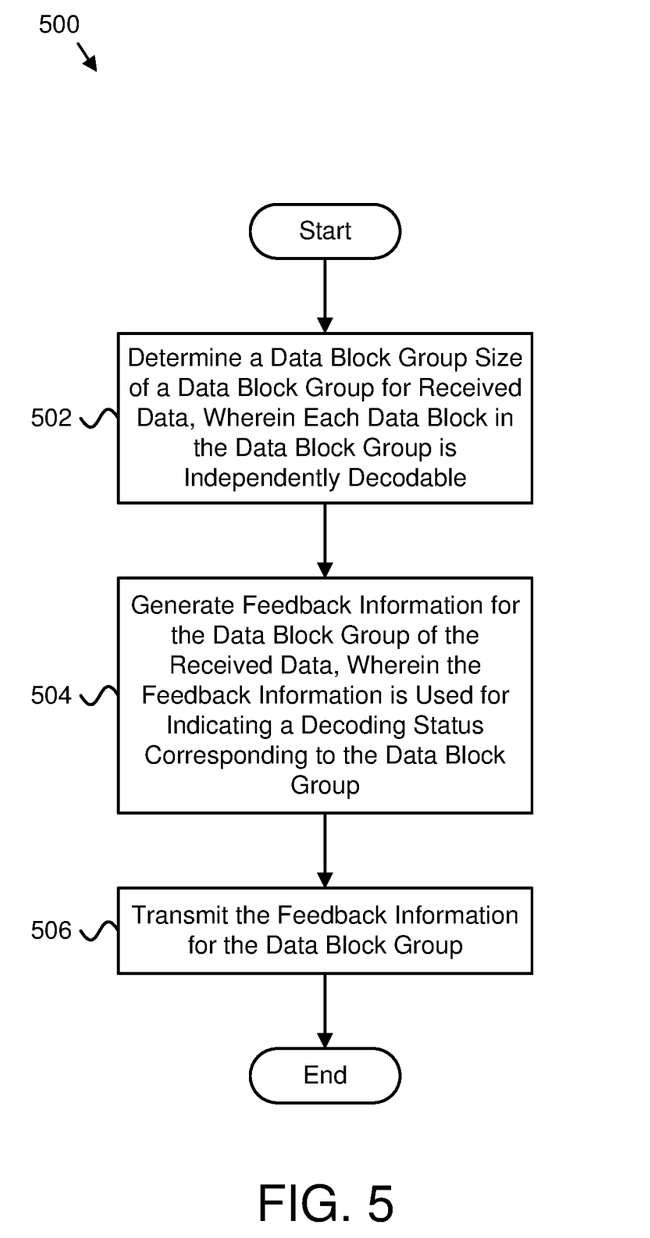
FIG. 5 is a schematic flow chart diagram illustrating one embodiment of a method for transmitting feedback information for a data block group.

FIG. 5 is a schematic flow chart diagram illustrating one embodiment of a method 500 for transmitting feedback information for a data block group. In some embodiments, the method 500 is performed by an apparatus, such as the base unit 104 or the remote unit 102. In certain embodiments, the method 500 may be performed by a processor executing program code, for example, a microcontroller, a microprocessor, a CPU, a GPU, an auxiliary processing unit, a FPGA, or the like.

The method 500 may include determining 502 a data block group size of a data block group for received data. In some embodiments, each data block in the data block group is independently decodable. In certain embodiments, determining 502 the data block group size corresponding to the received data includes selecting the data block group size from a predefined set of data block group sizes based on a number of data blocks of received data. The method 500 also includes generating 504 feedback information for the data block group of the received data. In various embodiments, the feedback information is used for indicating a decoding status corresponding to the data block group.

In one embodiment, the method 500 includes transmitting 506 the feedback information for the data block group. In one embodiment, the method 500 includes receiving a signal indicating a set of data block group sizes. In a further embodiment, the method 500 includes receiving a signal indicating the data block group size from the set of data block group sizes for the received data. In certain embodiments, the method 500 includes receiving a signal indicating the data block group size from a predefined set of data block group sizes for the received data.

In various embodiments, the method 500 includes generating 504 the feedback information for the data block group of the received data by performing a logic operation on a decoding status corresponding to each data block of the data block group. In certain embodiments, the logic operation includes an AND operation. In one embodiment, the received data includes multiple data block groups and a number of data blocks in a last data block group of the multiple data block groups is smaller than the data block group size. In some embodiments, the data block group size is a feedback bundling size for generating a decoding status of a whole data block group by performing a logic AND operation on a decoding status corresponding to each data block within the data block group of the received data. In various embodiments, the decoding status corresponding to each data block is an ACK in response to the respective data block being correctly decoded and a NACK in response to the respective data block not being correctly decoded.

In certain embodiments, the received data includes multiple data block groups and feedback information for each data block group of the multiple data block groups of the received data is transmitted together. In some embodiments, data blocks in the data block group have consecutive data block numbers. In various embodiments, a number of data block groups of the received data is equal to a ceiling of a number of data blocks of the received data divided by the data block group size.

Figure 6:
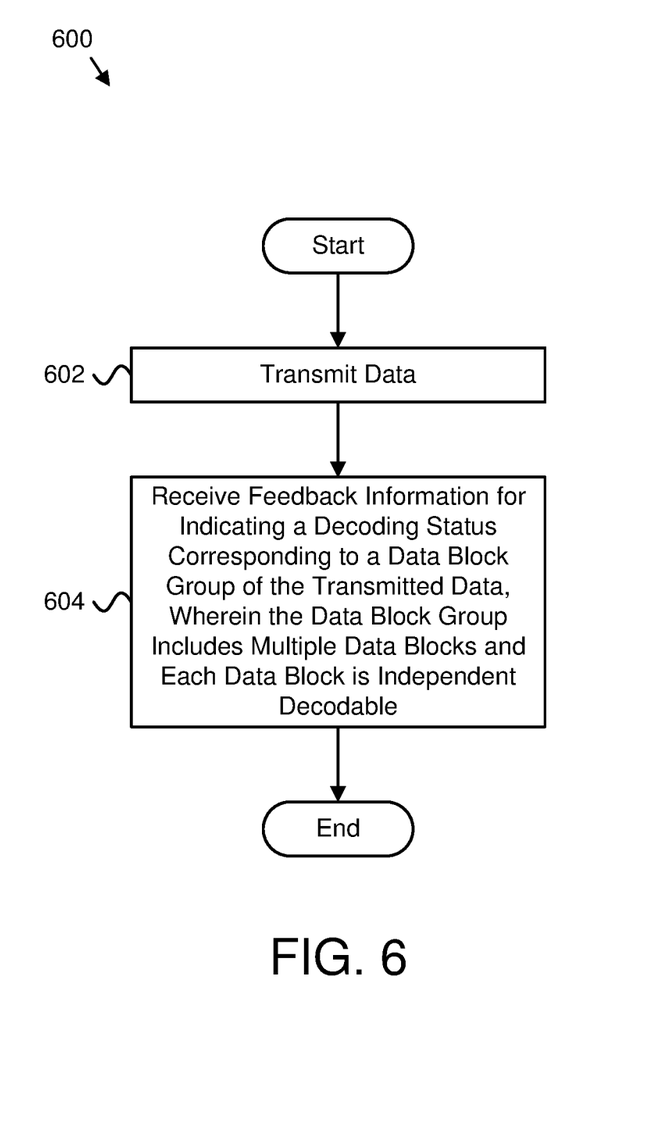
FIG. 6 is a schematic flow chart diagram illustrating another embodiment of a method for receiving feedback information for a data block group.

FIG. 6 is a schematic flow chart diagram illustrating one embodiment of a method 600 for receiving feedback information for a data block group. In some embodiments, the method 600 is performed by an apparatus, such as the remote unit 102 or the base unit 104. In certain embodiments, the method 600 may be performed by a processor executing program code, for example, a microcontroller, a microprocessor, a CPU, a GPU, an auxiliary processing unit, a FPGA, or the like.

The method 600 may include transmitting 602 data. The method 600 also includes receiving 604 feedback information for indicating a decoding status corresponding to a data block group of the transmitted data. In various embodiments, the data block group includes multiple data blocks and each data block is independently decodable.

In one embodiment, the method 600 determines a size of the data block group for the transmitted data. In a further embodiment, the method 600 transmits a signal indicating a set of sizes of the data block group. In certain embodiments, the method 600 transmits a signal indicating a size of the data block group from the set of the sizes of the data block group for the transmitted data.

In some embodiments, the method 600 transmits a signal indicating the size of the data block group from a predefined set of sizes of the data block group for the transmitted data. In various embodiments, a size of the data block group is selected from a predefined set of sizes of the data block group based on a number of data blocks of the transmitted data. In certain embodiments, the feedback information for a data block group of the transmitted data is generated by performing a logic operation on a decoding status corresponding to each data block within the data block group of the transmitted data. In one embodiment, the logic operation includes an AND operation. In some embodiments, the transmitted data includes multiple data block groups and a number of data blocks in a last data block group of the multiple data block groups is smaller than that of other data block groups of the multiple data block groups. In various embodiments, a data block group size is a feedback bundling size for generating a decoding status of a whole data block group by performing logic AND operation on a decoding status corresponding to each data block within the data block group of the transmitted data.

In certain embodiments, the decoding status corresponding to each data block is an ACK in response to the respective data block being correctly decoded and a NACK in response to the respective data block not being correctly decoded. In some embodiments, the transmitted data includes multiple data block groups and the feedback information for each data block group of the multiple data block groups of the transmitted data is received together. In various embodiment, data blocks in the data block group have consecutive data block number. In one embodiment, a number of data block groups of the transmitted data is equal to a ceiling of a number of data blocks of the transmitted data divided by the data block group size. In certain embodiments, the transmitter retransmits data blocks within the data block group of the transmitted data in response to corresponding feedback information for the data block group indicating that the data blocks within the data block group are not being correctly decoded. In some embodiments, the transmitter transmits signaling indicating a size of a data block group for the retransmitted data.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a receiver that:
receives data, wherein the data comprises a plurality of data block groups, each data block in a data block group of the plurality of data block groups is independently decodable and data blocks in the data block group of the plurality of data block groups are contiguously indexed; and
receives information indicating a parameter, wherein the parameter identifies a selection of a size of a set of sizes for the data;
a processor that:
determines a data block group size of a data block group for received data based on the parameter, wherein the data block group size of each data block group of the plurality of data block groups is approximately equal;
for each data block group of the plurality of data block groups, lists hybrid automatic repeat request bits in ascending order of indices corresponding to the data blocks in the data block group;
generates feedback information for each data block group of the plurality of data block groups based on the parameter, wherein the feedback information comprises a single bit generated by bundling feedback bits corresponding to a number of data blocks of the data block group to one bit by a logical AND operation; and
concatenates the feedback information for each data block group of the plurality of data block groups; and
a transmitter that transmits the concatenated feedback information for the data block group, wherein the receiver receives second data having an adjusted size based on the concatenated feedback information.

2. The apparatus of claim 1, wherein the receiver further receives a signal indicating a set of data block group sizes.

3. The apparatus of claim 2, wherein the data block group size is determined from the set of data block group sizes for the received data based on the parameter.

4. The apparatus of claim 1, wherein the data block group size is determined from a predefined set of data block group sizes for the received data based on the parameter.

5. The apparatus of claim 1, wherein bundling feedback bits corresponding to a number of data blocks of the data block group to one bit comprises performing a logic operation among the feedback bits corresponding to data blocks of the data block group.

6. The apparatus of claim 5, wherein the logic operation comprises an AND operation.

7. A method comprising:
receiving data, wherein the data comprises a plurality of data block groups, each data block in a data block group of the plurality of data block groups is independently decodable and data blocks in the data block group of the plurality of data block groups are contiguously indexed;
receiving information indicating a parameter, wherein the parameter identifies a selection of a size of a set of sizes for the data;
determining a data block group size of a data block group for received data based on the parameter, wherein the data block group size of each data block group of the plurality of data block groups is approximately equal;
for each data block group of the plurality of data block groups, listing hybrid automatic repeat request bits in ascending order of indices corresponding to the data blocks in the data block group;
generating feedback information for each data block group of the plurality of data block groups based on the parameter, wherein the feedback information comprises a single bit generated by bundling feedback bits corresponding to a number of data blocks of the data block group to one bit by a logical AND operation;
concatenating the feedback information for each data block group of the plurality of data block groups;
transmitting the concatenated feedback information for the data block group; and
receiving second data having an adjusted size based on the concatenated feedback information.

8. The method of claim 7, wherein the data block group size is a feedback bundling size for generating a decoding status of a whole data block group by performing a logic AND operation on a decoding status corresponding to each data block within the data block group of the received data.

9. The method of claim 8, wherein the decoding status corresponding to each data block is an ACKNOWLEDGEMENT ("ACK") in response to the respective data block being correctly decoded and a NEGATIVE ACKNOWLEDGEMENT ("NACK") in response to the respective data block not being correctly decoded.

10. The method of claim 7, wherein the received data comprises a plurality of data block groups and feedback information for each data block group of the plurality of data block groups of the received data is transmitted together.

11. The method of claim 7, wherein data blocks in the data block group have consecutive data block numbers.

12. The method of claim 7, wherein a number of data block groups of the received data is equal to a ceiling of a number of data blocks of the received data divided by the data block group size.

13. An apparatus comprising:
a transmitter that:
transmits data, wherein the data comprises a plurality of data block groups, each data block in a data block group of the plurality of data block groups is independently decodable and data blocks in the data block group of the plurality of data block groups are contiguously indexed; and
transmits information indicating a parameter for determining a size of a data block group, wherein the parameter identifies a selection of a size of a set of sizes for the data, the data block group comprises a plurality of data blocks, and each data block is independently decodable; and
a receiver that receives concatenated feedback information for the data block group, wherein the feedback information comprises a single bit generated by bundling feedback bits corresponding to a number of data blocks to one bit by a logical AND operation, and the feedback information is concatenated for each data block group of the plurality of data block groups, wherein the transmitter transmits second data having an adjusted size based on the concatenated feedback information.

14. The apparatus of claim 13, further comprising a processor that determines a size of the data block group for the transmitted data.

15. The apparatus of claim 13, wherein the transmitter further transmits a signal indicating a set of sizes of the data block group.

16. The apparatus of claim 15, wherein the size of the data block group is determined from the set of the sizes of the data block group for the transmitted data based on the parameter.

17. The apparatus of claim 13, wherein the size of the data block group is determined from a predefined set of sizes of the data block group for the transmitted data based on the parameter.

18. A method comprising:
transmitting data, wherein the data comprises a plurality of data block groups, each data block in a data block group of the plurality of data block groups is independently decodable and data blocks in the data block group of the plurality of data block groups are contiguously indexed;
transmitting information indicating a parameter for determining a size of a data block group, wherein the parameter identifies a selection of a size of a set of sizes for the data, the data block group comprises a plurality of data blocks, and each data block is independently decodable;
receiving concatenated feedback information for the data block group, wherein the feedback information comprises a single bit generated by bundling feedback bits corresponding to a number of data blocks to one bit by a logical AND operation, and the feedback information is concatenated for each data block group of the plurality of data block groups; and
transmitting second data having an adjusted size based on the concatenated feedback information.

* * * * *